UNITED STATES PATENT OFFICE.

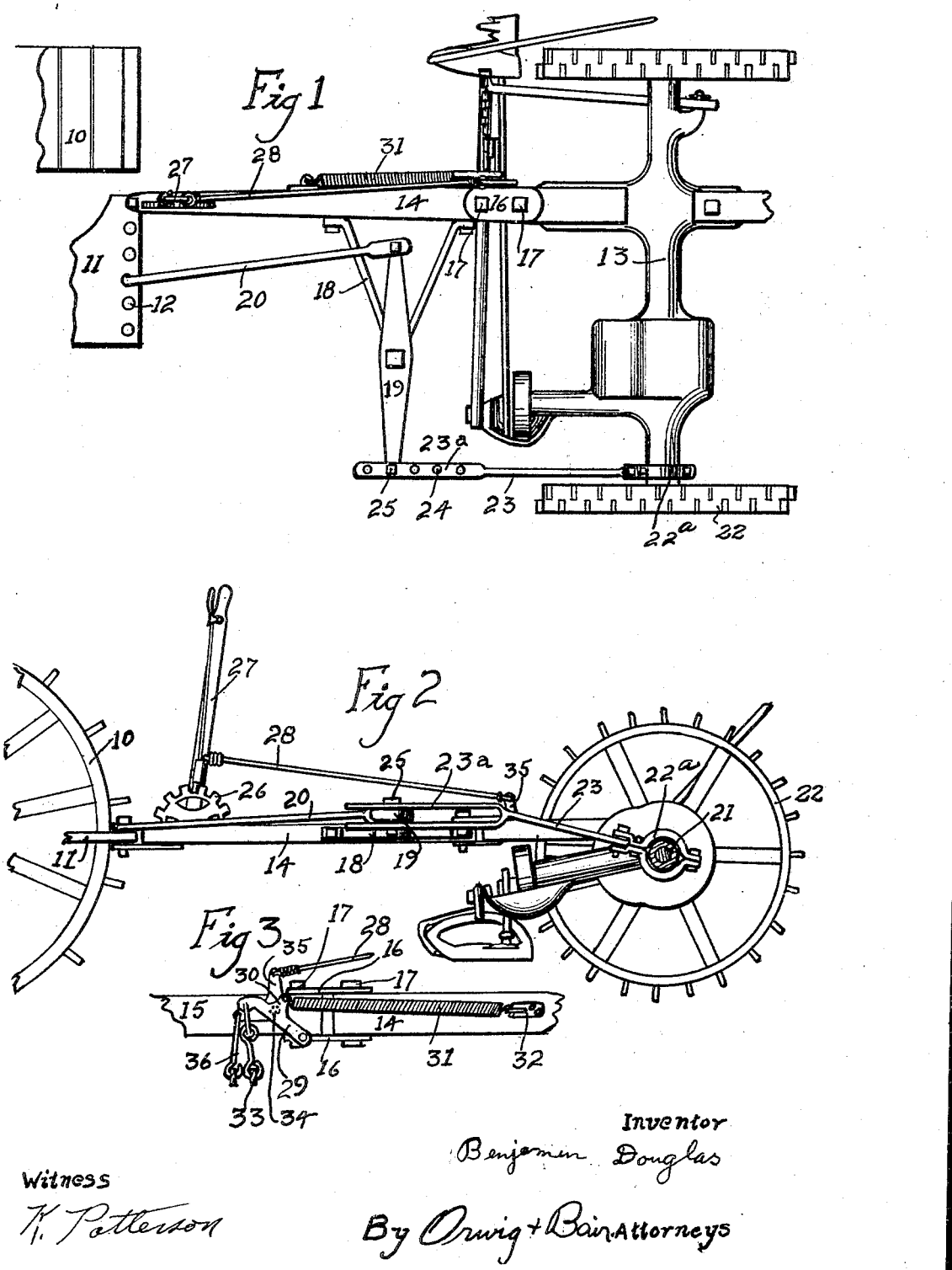

BENJAMIN DOUGLASS, OF FULTON, ARKANSAS.

STEERING DEVICE FOR TRACTOR-DRAWN MACHINES.

1,420,188.　　　　　Specification of Letters Patent.　　Patented June 20, 1922.

Application filed June 8, 1920. Serial No. 387,458.

*To all whom it may concern:*

Be it known that I, BENJAMIN DOUGLASS, a citizen of the United States, and a resident of Fulton, in the county of Hempstead and State of Arkansas, have invented a certain new and useful Steering Device for Tractor-Drawn Machines, of which the following is a specification.

The object of my invention is to provide a steering device, particularly adapted for use such, for instance, on mowers or the like drawn behind a tractor. The device being so constructed that the machine may be made to follow substantially behind the tractor in making turns.

With this and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a mowing machine and a tractor draw bar equipped with an attachment embodying my invention.

Figure 2 shows a side elevation of the same; and

Figure 3 shows a side elevation of a part of the mechanism taken from the opposite side of the machine shown in Figure 2.

In the accompanying drawing, I have used the reference numeral 10 to indicate generally a small portion of a tractor having the draw bar 11, and having the transversely spaced holes 12 to which fastening devices may be secured.

I have shown an independent piece of machinery, such for instance as the mower 13, having the short tongue 14. The tongue 14 is connected with the frame member 15 of the mower by means of a pair of strips or plates 16, and by suitable bolts 17.

The plates or strips 16 are horizontal as shown in Figures 1 and 3, and by the arrangement described the tongue 14 is mounted for horizontal pivotal movement with relation to the mower frame. Secured to the tongue 14 is a laterally extending bracket 18, on which is centrally pivoted a lever 19. A rod 20 is pivoted to the ends of the lever adjacent to the tongue 14, and extends from thence forwardly to the draw bar 11, to which said rod is also pivoted.

Mounted on the axle housing 21 near one of the wheels 22 of the mower, is a two-part clamp 22ª to which is pivoted a bar 23 extending forwardly and slightly upwardly in the machine. The bar 23 is bifurcated at its forward end, and has an arm 23ª which are provided with spaced registering holes 24 in one pair of which there is selectively mounted a bolt 25, mounted in the end of the lever 19 opposite the rod 20.

I have provided also a means for raising and lowering the sickle bar from the tractor. On the tongue 14 is mounted a notched sector 26 adjacent to which is an ordinary controlling lever 27. Pivoted to the lever 27 is a rearwardly extending rod. Pivotally supported on the tongue adjacent to rear end of the rod 28 is a lever 29 having an ear 30 to which is secured a powerful coil spring 31 which extends forwardly and is fastened to the tongue 14 as at 32. The lever 29 extends rearwardly and upwardly from its pivot point as shown in Figure 3. Connected with the rear upper end of the lever 29 is a downwardly extending chain 33, which may be connected with the sickle bar frame.

The spring 31 supports the sickle bar with a cushioning effect. Pivoted between its ends on the lever 29 as at 34 is a bell crank lever 35 shown in Figure 3, one end of which projects upwardly and is connected with the rod 28. Connected with the other end of the bell crank lever 35 is a sickle bar raising chain 36. It will be seen that by means of the lever 27 and the parts connected therewith, it is possible for the driver of the tractor to control the sickle bar from the tractor.

In the practical use of my improved steering device, it will be seen that when a tractor is hitched to a mower, and the tractor and mower are equipped with an attachment embodying my invention, and the tractor is turned to the left at a corner, the tendency will be for the forward end of the short pivoted tongue 14 to swing to the left. The ordinary result of such tendency would be to cause the mower to travel on a curved path on the inside of the path taken by the tractor. With my device, however, the draw bar 11 pushes rearwardly on the rod 20 which tends to swing the lever 19, but such tendency of the lever 19 to swing is prevented very largely by the rod 23, so that the mower will take a wide circle and will follow substantially in the track of the tractor. It will be noted in the drawings that the rear end of the rod 20 is pivoted closer to the tongue 14 than the forward end thereof. This makes it possible in turning to the right for the draw bar 11 to swing somewhat or the tongue 14 to swing somewhat to the right, so that a much shorter turn can be made with the mower and the mower will not follow so closely in the path of the tractor.

The effectiveness of the attachment may be varied somewhat by connecting the forward ends of the rod 20 with the draw bar 11 at different points transversely thereof.

Some changes may be made in the construction and arrangement of my improved steering device, without departing from the real spirit and purpose of my invention, and it is my intention to cover by my claims, any modified forms of structure, or use of mechanical equivalents which may be reasonably included within their scope.

I claim as my invention:

1. In combination, a machine, a tractor draw bar, a tongue having one end pivoted to said machine to swing in a horizontal plane, the opposite end of said tongue being universally pivoted to one end of said tractor draw bar; a horizontal and laterally extending bracket attached to said tongue, a transversely arranged lever pivoted to the free end of said bracket, a link having one end pivoted to the inner end of said lever and having its opposite end universally pivoted to said draw bar, a distance from the pivotal point of said tongue, a link having one end pivotally connected to the outer end of said lever, and means for pivotally and detachably connecting the opposite end of said link to a frame member of said machine.

2. In combination, a machine, a tractor draw bar provided with a series of transversely arranged holes, a tongue having one end pivotally connected to said machine to swing in a horizontal plane and its opposite end universally pivoted in a hole in one end of said draw bar, a bracket extending laterally and horizontally in one side of said tongue, a lever pivoted between its ends to the free end of said bracket, a link having one end pivoted to the inner end of said lever and the opposite end universally pivoted in one of the holes of said draw bar, a second link having one end adjustably pivoted to the outer end of said lever, a detachable clamp for pivotally securing the opposite end of said link to a frame member of said machine, said links being substantially parallel with the said tongue and on the same side as the draw bar and bracket.

BENJAMIN DOUGLASS.